3,814,647
HIGH PRESSURE DECORATIVE LAMINATE WITH INK SURFACE REGISTERED WITH EMBOSSING
Herbert I. Scher and Israel S. Ungar, Randallstown, and John E. McQuade, Jr., Baltimore, Md., assignors to Esso Research and Engineering Company
Filed May 24, 1972, Ser. No. 256,455
Int. Cl. B32b 31/04, 31/12, 31/22
U.S. Cl. 156—219    4 Claims

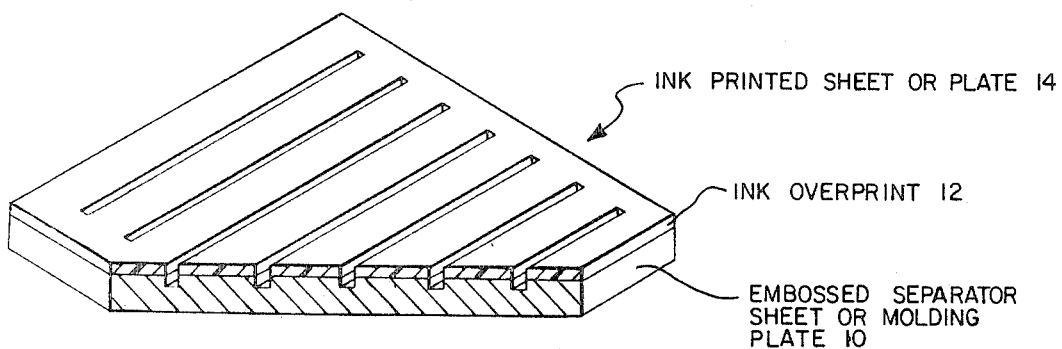
FIG. 1
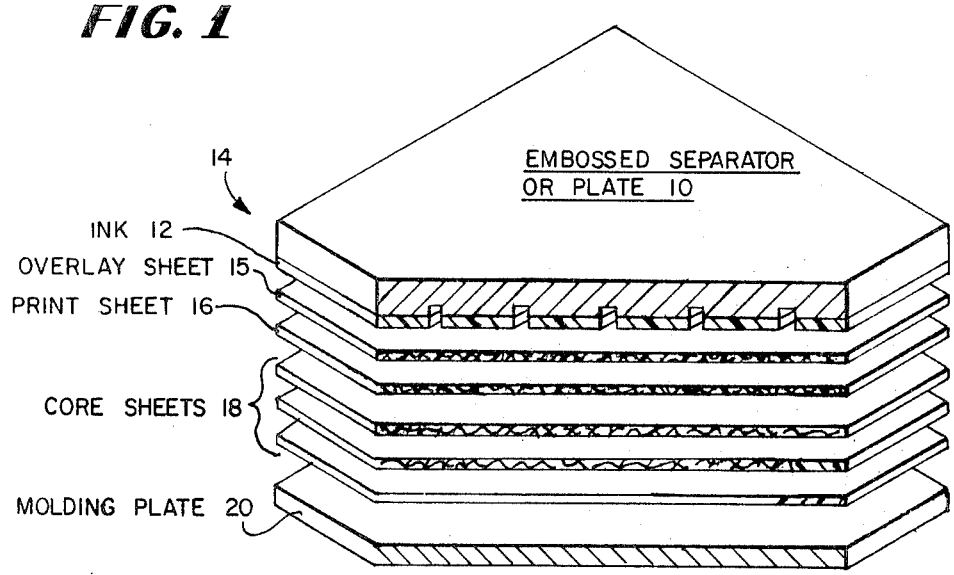
FIG. 2
FIG. 3
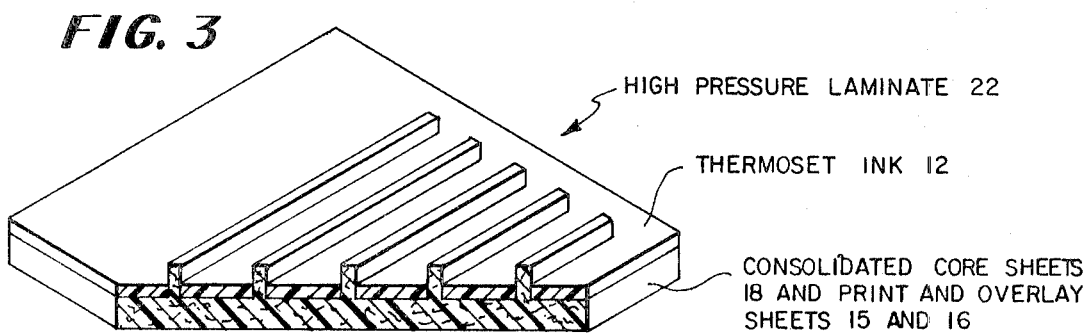

ABSTRACT OF THE DISCLOSURE

A decorative high pressure laminate meeting NEMA standards and having registered color and embossing with a thermosetting ink forming at least a portion of the upper surface is produced by printing a filled, pigmented, thermosetting ink in a design in registry with an embossed molding surface. The ink layer is partially cured and the composite is used to emboss a high pressure laminate, the transferred ink laminating and solidifying to a hard intractable mass.

---

The present invention relates to a high pressure laminate and, more particularly, to such a laminate meeting NEMA standards which has registered color and embossing with ink forming at least a portion of the upper surface thereof, and to a method of manufacturing such a laminate.

The production of high pressure laminates is well known and has been carried out for many years. Generally, the procedure for forming such a laminate involves providing phenolic resin impregnated paper core sheets and melamine resin decorative and overlay sheets, and pressing the stacked resin impregnated sheet under heat on the order of 230–310° F. and under pressure of approximately 800–1,600 p.s.i. until the resin has become thermoset, thereby providing an extremely hard, attractive and permanent surfacing material known as a "High Pressure Laminate" meeting NEMA standards; such laminates have, for many years, found use as counter and table tops, bathroom and kitchen work surfaces, furniture and cabinets, wall panel and partitions, and doors.

In the early years of production of high pressure laminates, generally only glossy surface laminates were produced using polished molding surfaces, though some attempts were made to provide laminates with some slight surface irregularities to give satin or textured finishes. In more recent years, it has become increasingly desirable to provide various types of irregular surfaces, and these range from those having relatively shallow depressions, such as textured (e.g. satin, matte or semi-gloss), to relatively deeply sculptured surfaces which have noticeable 3-dimensional effects, such as wood grain, leather, slate, etc. With the rising cost of such natural products, it has become even more desirable to provide irregularly surfaced high pressure laminates which simulate these natural materials.

In many cases it is desirable for special designed effects to use two different high pressure type laminate configurations, one of which has one design and another of which has a second design. For example, one such laminate may be provided with a color and texture differing from the other surface, or an arbitrary sculptured design may be provided in which one level has a first color and a second level has a second color.

One example of a special effect would be the production of a desk top having a simulated leather middle portion surrounded by a simulated wood periphery. Heretofore, such a construction would usually have been formed by a fabrication technique wherein two separate laminates are cut and fitted together after having been separately molded. In those cases where a unitary construction was molded, this would have normally been provided by the utilization of special laminating die plates having varying surface configurations, such die plates being extremely expensive. A further difficulty in this latter procedure is the problem of registration, it being necessary to carefully interfit the two dissimilar pattern sheets prior to laminating so that they not only can be aligned with one another, but also can be properly aligned with the special laminating die plate along the periphery of the special surface configured area. This procedure is difficult, time consuming, expensive and has a high proportion of imperfectly formed products which must be discarded.

Where it has been desirable to provide a deeply embossed or sculptured surface having surface depth variations as great as 0.007 inch that duplicate natural products such as slate, leather, wood and the like, it has in the past generally been necessary to use either extremely expensive machined or etched steel plates or, alternatively, thermoset pressing plate dies such as described in the Michaelson et al. Pat. 3,303,081 or 3,311,520. While the use of such dies provide the necessary embossing, many simulated natural products, such as wood grain, must have appropriate color in registry with the surface embossing or debossing. Unfortunately the problem of registration of color and embossing has proven very difficult, conventional registry techniques such as used in the printing industry being unreliable on a consistent basis in the manufacture of high pressure laminates, and also being extremely expensive, often involving complex electronic sensing equipment.

A particularly difficult problem presented by the registry of color and embossing in the manufacture of high pressure laminates is the fact that up to the present time the color provided could not overlay the laminate, since any conventional color which might be provided would not be sufficiently resistant to abrasion and other effects to meet NEMA standards, and, in such a situation, the laminate could not be properly called a "high pressure laminate." Accordingly, it has heretofore been necessary in providing high pressure laminates wherein the color and embossing are in registry, to separately provide the printing and the embossing, to cover the printing with a protective transparent overlay, and to then, prior to lamination, align or register the separately produced items, and to maintain the registration during the laminating operation. Even where this has been successfully accomplished, the cost has been high, not only because of the complexity of the procedure, but also because of the high percentage of imperfect laminates produced which must be discarded or sold as seconds.

Heretofore, in the production of high pressure laminates of any type and whether glossy, textured and/or embossed, in order to meet NEMA standards it has always been necessary to use either an overlay sheet to protect the print or design (e.g., see Latella et al. Pat. 3,067,077); or in those few cases where an overlay was not used, it was necessary to provide color throughout the thickness of the print sheet or to provide the print on the bottom surface of the print sheet, in which case it was necessary to print a mirror image of the design desired. While use of an overlay has presented no serious difficulty in the manufacture of most glossy and textured laminates, this has provided a serious registration problem as explained above in the production of embossed laminates where registry of color and embossing is essential.

It is, accordingly, an object of the present invention to overcome or at least reduce the defects of the prior art, such as indicated above.

It is another object of the present invention to produce decorative high pressure laminates, having registered color and embossing, in a simplified and inexpensive manner.

It is another object of the present invention to provide a decorative high pressure laminate meeting NEMA standards which has color and embossing and which has ink in its uppermost layers.

It is another object of the present invention to provide a new and improved method for inexpensively manufacturing high pressure laminates having registered color and embossing.

It is another object of the present invention to provide a transfer procedure for producing relatively low cost, high pressure decorative laminates having registered color and embossing.

In the present exemplification of this invention, there is disclosed a method by which a suitable thermosetting ink is applied to an embossed pressing plate die in registry with the embossing of the die, and wherein such printed die is used in a laminating procedure and the ink is transferred to the laminate as an upper layer having registered color and embossing; the resultant laminate, including the upper layer of hardened ink, meets NEMA standards.

To the attainment of these ends and the accomplishment of the above as well as new and useful objects as will appear below, the invention relates to the features of novelty in substantially the construction, combination and arrangement of several parts here and there more fully described and shown in the accompanying drawings as an example illustrating this invention, and in which:

FIG. 1 schematically shows a sculptured pressing plate die having an ink coating applied thereto;

FIG. 2 illustratively shows utilization of the printed pressing plate die of FIG. 1 in the production of a high pressure laminate having registered color and embossing; and FIG. 3 schematically shows the resultant laminate meeting NEMA standards.

Referring to FIG. 1 there will be seen an embossed separator sheet or molding plate 10, hereinafter referred to as the "embossed plate," of desired surface configuration provided with a special ink over print 12. The ink coated sheet or plate 14 is used in the operation shown schematically in FIG. 2 to produce a decorative high pressure laminate. The assembly provided in FIG. 2 comprises, beneath the ink coated plate 14, a conventional print sheet 16, a plurality of phenolic impregnated core sheets 18, and a bottom molding plate 20. It is preferred that a conventional overlay sheet 15 also be provided in the assembly, above the print sheet 16.

The assembly of FIG. 2 is cured under normal heat and pressure as indicated above. The resultant laminate 22, shown in FIG. 3, provided after the embossed plate 10 has been peeled from the pressed assembly, has along a portion of its surface the overprint ink layer 12 which has been transferred from the embossed plate 10. FIG. 3 shows the product schematically, it being understood that the thermoset ink 12 is actually infused into the upper surface of the overlay sheet 15, or—in the absence of an overlay sheet—into the upper surface of the print sheet 16. It is seen that the embossing and color provided by the ink 12 and the print sheet 16 are perfectly aligned, the ink diffusing only vertically.

Referring again to FIG. 2, it will be understood that the print sheet 16 is of conventional construction, preferably an alpha-cellulose paper impregnated with melamine-formaldehyde resin; the print sheet 16 may be impregnated with dye of a suitable color, or it may be overprinted with a suitable color and/or design. Where used, the overlay 15 is also preferably of melamine resin impregnated alpha-cellulose paper in accordance with common practice. The core sheets are also of conventional construction, preferably Kraft paper, impregnated with phenol-formaldehyde resin. Similarly, the molding plate 20 is a conventional plate such as a flat iron or steel plate.

The embossed plate 10 may be of the type described in Jenkins Pat. 2,606,855 or the Michaelson et al. Pats. 3,303,081 and 3,311,520; or even an expensive machined or etched steel plate may be used. If dies of the type described in the Michaelson et al patents are used, they should be coated with a release agent. However, the preferred construction of embossed plate 10 is that described in the copending Scher and Ungar application Ser. No. 865,894, filed Oct. 13, 1969; such a molding and embossing plate consists of a thin, embossed, impregnated separator sheet having a non-stick facing. The surface of such a separator sheet 10 provides a satisfactory surface to receive the special thermosetting ink overprint 12, and yet during the laminating procedure the ink layer 12 transfers easily from the separator sheet 10 which may then be discarded. If such a separator is used, then it should be backed up by a molding plate similar to the molding plate 20.

An important feature of the present invention is the proper selection of a thermosetting ink which will ultimately form the overprinted ink 12 in the final laminate 22. This ink must be capable not only of easy application in the desired pattern to the embossed plate 10, but it must be capable of transferring properly without running or sideways migration during the laminating operation and must also, after complete curing, be capable of meeting NEMA standards. The two most difficult conditions are those of downward migration only, without sidewards diffusion, to give sharp pattern edges, and curing to a sufficient hardness and resistance to become part of the ultimate laminate surface which meets the NEMA standards.

The inks which meet the above requirements are those based on amino resins, preferably on melamine-formaldahyde resin. These thermosetting melamine-formaldahyde resins may be in their normal uncured aqueous fom, or they may be partially cured, ground and dispersed in a suitable carrier.

In aqueous form, in order to have the proper effect in use, the composition should fall within the following range: for 100 parts of conventional aqueous methylol melamine resin of 40–60% solids there should be based on such solids, 0.5–2% surfactant, 10–100% pigment, 1–20% silica, 1–20% polyol or glycol and sufficient reducer, such as a 50–50 mixture of isopropyl alcohol and water, to provide a desirable printing viscosity.

The thermosetting melamine resin serves as ink vehicle, pigment binder and compatible resin to produce the suitable high pressure laminate. The surfactant, which may be any compatible detergent, aids in pigment dispersion and substrate wetting. The pigment, to which soluble dyes may be added, imparts hiding power, opacity and color. The silica or other suitable powdered filler imparts thickening and anti-settling properties to the ink composition. The polyol or glycol improves the workability of the liquid ink and retards its spoiling; it also imparts flexibility to the dry ink film 12 before transfer to the laminate. The reducer, which may be any compatible inert liquid, is provided for viscosity adjustment.

On the other hand, the preferred ink which has improved cohesiveness and adhesion to the plate 10 comprises a thermosettable pigmented melamine powder dispersed in a binder. This ink may be made by dying or pigmenting methylol melamine resin solution normally used to impregnate print and overlay sheets for the production of high pressure laminates. Such pigmented resin solution is then dried of its solvent to leave a dry, pigmented, sub-cured methylol melamine resin solid which is heated to advance the resin to the resitol or "B" state of 5–15% volatility. The partially cured pigmented resin is then commutated to a fine powder of about 149 microns or less by suitable means such as ball milling and the finely divided pigmented resin powder is dispersed in a dilute solution of a compatible polymeric binder such as cellulose acetate solution, nitro cellulose solution, polyvinyl alcohol solution, hydroxypropyl cellulose solution or ethyl cellulose solution of suitable printing viscosity. Silica, surfactant and reducer may also be included in the dispersion.

Once the thermosettable ink has been formulated, it may be applied to the embossed separator sheet or molding plate 10 by any suitable printing technique. For example, it may be continuously applied by an ink printing roller so as to cover only the high spots of the embossed plate 10 to provide a plate 14 of the type shown in FIG. 1 which is covered with the ink only along its elevated portions, and with its depressed portions having no ink thereon. Alternately, the ink may be printed so as to fill the depressions of the embossed separator or plate 10. At any rate, it will be evident that the ink is applied in a very simple manner directly onto the embossed plate 10 and in exact registration with the embossed pattern thereon, and the printing may be accomplished by other known techniques, such as flexographic silk screen, valley printing, gravure, letterpress, stencil, etc.

One the ink has been printed on the embossed plate 10, the ink is then dried and, if necessary, cured, such as in an oven. If the ink is printed on a continuous separator sheet as it is manufactured, such as in accordance with the Scher and Ungar technique in application Ser. No. 865,894 now Pat. No. 3,674,619, then directly after the continuous printing it may then be passed to a continuous drying oven prior to cutting to a given size. It will be understood that where the preferred ink, comprising pigmented melamine powder dispersed in a suitable polymeric binder, is used then it is only necessary to dry the ink. However, where the ink composition comprises a mixture of aqueous methylol melamine resin, surfactant, pigment, silica or the like, polyol or glycol or the like, and the reducer if necessary, then it is desirable to cure the ink to the B or resitol stage.

When the ink has finally been dried and/or cured, the ink printed sheet or plate 14 is then ready for use in the high pressure laminating procedure to produce the high pressure laminate meeting NEMA standards and having registered color and embossing. It will be seen, as mentioned above, that portions of the resultant laminate as shown in FIG. 3 will be provided with color from the ink 12 which has become infused into the upper surface of the laminate in locations corresponding to the designs printed on the separator sheet 10, while other portions will be provided with color from the print sheet 16. It will also be seen that there is exact registry between embossing and the different colors.

Some of the advantages of the present invention are: the ink printed sheet or plate 14 is handled as a single unit which is capable of simultaneously embossing and coloring a high pressure laminate with proper registry. The chance of the embossing medium and the color medium shifting out of registry during production, handling and processing, is greatly reduced—this can happen only if the ink runs—and this provides a new result which, with the exception of the invention set forth in copending application Ser. No. 62,780, now Pat. No. 3,661,672, has not been possible with past attempts.

The possibilities for producing registered 3-dimensional laminates by the present invention are many and varied, limited only by imagination. Decorative patterns of intricate design or simple shapes registered with one or more colors with different textures may be produced in relief or in intaglio. Wood grain patterns may be embellished with 3-dimensional ticking to give the feel and appearance of natural wood. Laminates may be produced displaying messages where the characters are raised, i.e., embossed, or lowered, i.e. debossed, and are of different colors and textures surrounding such characters. Additionally, while the exemplified embodiment shows the production of a one-side-good laminate, it will be understood that two-side-good laminates can also be made by the present operation.

The product produced actually differs from any prior product in that the ink is actually incorporated into the thickness of the top sheet of the laminate, whereas previously it was always necessary to protect the print by providing the print either beneath an overlay or at the interface of the print sheet and the core sheets. It was previously not possible to provide such a product in a high pressure laminate, because when the print was previously placed at the top of the laminate, the product would not meet NEMA standards.

To more fully describe the invention, specific examples, offered for illustration but not limitation are provided:

EXAMPLE 1

A rigid, embossed separator 10 was made having a release surface, such as by the technique disclosed in application Ser. No. 865,894. During processing, a pigmented, filled ink was printed in registry with the texture. The ink formulation was as follows:

| | Parts |
|---|---|
| Melamine-formaldehyde resin, 45% solids | 200 |
| Tergitol NBX (non-ionic surfactant) | 1 |
| Tergitol No. 7 (anionic surfactant) | 1 |
| Cab-o-Sil M–5 (silica) | 5 |
| Solka Flock (cellulose fiber) | 3 |
| Titanium dioxide pigment | 60 |
| Fastasol Green (green dye) | 1 |

The coated, embossed separator 14 was then cured in an oven to the B-stage. The ink components were blended by normal methods. The inked, embossed plate 14 was then used to press at 300° F. and 1,000 p.s.i. a normal laminate assembly such as shown in FIG. 2. A laminate was produced having a smooth border with a cloth textured central portion. The cloth portion was colored a blue-green in contrast to the smooth white border.

Using the above technique it was possible to produce a multiplicity of textures and colors on one laminate with only one pressing. The laminate surface, both pigmented and unpigmented portion, passed the NEMA abrasion and boiling water tests. The ink transfer into the surface of the overlay sheet 15, or the solid color print sheet 16 in the absence of an overlay sheet 15, of the laminate was without any sideward diffusing along the plane of the surface, and accordingly the product had sharp patterned edges.

The NEMA test standards which the product of Example 1 withstood are test LD1–2.01—Tests for Resistance of Surface Wear; and test LD1–2.02—Test for Resistance of Surface to Boiling Water. The first of these tests involves abrading the surface of the laminate with sandpaper under specified conditions. If the rate of wear due to sanding exceeds 0.08 grams for each 100 cycles of abrading, the laminate fails the wear resistance test, and additionally, the sample must be capable of withstanding at least 400 cycles.

In the second or boiling water test, vigorously boiling water is poured on the surface of the sample and the container in which the water has been boiled is placed on top of this sample in the puddle of water and allowed to stand for twenty minutes. If there is any blistering or any other discernible surface disturbance, then the sample fails the NEMA test.

EXAMPLE 2

The following ink components were provided:

| | Parts |
|---|---|
| Aqueous methylol melamine resin solution (50% solids) | 200 |
| Triton X–100 (isooctyl phenol polyethoxyethanol) | 1 |
| Rutile titanium dioxide (American Cyanimid #OR342) | 60 |
| Cab-O-Sil M–5 (Cabot Corporation) | 10 |
| Polyethylene glycol 600 | 10 |

The Triton X–100 and the titanium dioxide pigment were added to the resin solution and dispersed by a high speed dispersion device to provide a fineness of at least 4 on the Hegman scale. The speed was reduced and the silica and polyethylene glycol were added. Dispersion was continued at a slow speed until the ink viscosity was maintained at a constant value. The ink had the following properties:

| | |
|---|---|
| Pigment to binder ratio | 0.6 |
| Pigment volume concentration, percent | 18.2 |
| Solids, percent | 60.5 |
| Viscosity (unthinned) (Brookfield No. 4 spindle at 6 r.p.m.), cps. | 43,500 |
| Adjusted pH | 9.0–9.5 |

Sufficient diluent, a 50–50 mixture of water and isopropyl alcohol, was added to provide a suitable viscosity for printing.

The ink was used as follows:

A decorative separator sheet embossed in a stainless steel press plate, similar to embossed plate 10, was coated with the ink by silk screen in registration with the embossed pattern. The transfer ink was then advanced to the resitol state by heating the coated press plate for five minutes at 260° F. The water-isopropyl alcohol diluent or reducer was expelled during the early stages of heating and the transfer ink advanced to where 5.6% volatile materials remained as condensation by product. On cooling, the transfer ink remained as a continuous film temporarily adhered to the press plate.

The inked press plate was then placed inked surface against an overlay of an ordinary high pressure laminate make-up consisting of melamine impregnated overlay and decorative sheets backed up by five phenolic impregnated core sheets. The composite assembly was heated and pressed in the customary manner including cooling under pressure, the actual pressing conditions being 1,000 p.s.i.g. and 300° F. for fifteen minutes followed by cooling for an additional fifteen minutes while maintaining the pressure.

During the laminating operation, the ink transferred from the press plate and became incorporated into the laminate overlay where its cure was completed as part of the laminate. The finished laminate exhibited areas that were embossed by the press plate and colored with good registration by the ink with complete opacity in the embossed areas. The laminate was tested following the NEMA durability standards at both the inked and uninked sections, and the laminate exceeded such durability standards.

EXAMPLE 3A

Into a 1,000 ml. stainless steel beaker there were added, along with water-isopropyl alcohol reducer, with stirring the following ingredients in the order listed:

| | Grams |
|---|---|
| Methylol melamine resin solution at 50% solids (Cymel-American Cyanamid Company) | 400 |
| Rutile titanium dioxide (Cyanamid Unitane OR–560) | 175 |
| Carbon (Cabot Black Regal SR pigment) | 3.5 |
| Silica (Cab-O-Sil M–5) | 20 |
| Triton X–100 non-ionic surfactant (Rohm & Haas) | 4 |

The mixture was dispersed at high speed for thirty minutes, followed by vacuum stripping of water-isopropyl diluent. The non-ionic surfactant was incorporated to assist in dispersion of the pigment. The silica served to prevent pigment settling during vacuum stripping of the diluents. When diluent removal was complete, a hard brittle medium-gray colored resin mass remained. The resin mass was pulverized, then heated to 180° F. to effect curing of the resin to the resitol state at which point there was measured 10.7% volatiles as condensation product of polymerization. The pigmented resin material was then ground to a fine powder by jar milling for 2.5 hours using chrome-plated steel balls as the grinding medium. The powder that passed through a U.S. standard sieve No. 100 (opening 129 microns) was collected and used as in Example 4 below.

EXAMPLE 3B

The procedure of Example 3A was followed exactly except that the carbon black was omitted. The resulting material was a white colored pigmented melamine powder.

EXAMPLE 3C

The procedure of Example 3A was followed exactly except that the following ingredients were used:

| | Grams |
|---|---|
| Methylol melamine resin solution at 50% solids | 400 |
| Monastral Red BRT–790–D pigment (DuPont) | 125 |
| Cab-O-Sil M–5 | 20 |
| Triton X–100 | 3 |

The resulting material was a red colored pigmented melamine powder.

EXAMPLE 4

In order to formulate an ink from the melamine powders of Examples 3A, 3B, and 3C, the following binder solutions were prepared by mixing the indicated materials with moderate stirring until complete solution was achieved.

BINDER SOLUTION A

| | Grams |
|---|---|
| Ethyl acetate | 20 |
| Butyl acetate | 40 |
| Ethyl alcohol | 40 |
| Butyl alcohol | 20 |
| Toluene | 80 |
| Cellulose acetate | 25 |
| Santicizer 8 (N-ethyl-p-toluene sulfonamide) | 25 |

BINDER SOLUTION B

| | Grams |
|---|---|
| Nitro cellulose (¼ second) | 10 |
| Isoamyl acetate | 90 |

BINDER SOLUTION C

| | Grams |
|---|---|
| Polyvinyl alcohol (DuPont 51–05, 88 mold percent hydrolysis) | 25 |
| Isopropyl alcohol | 50 |
| Water | 75 |
| Glycerin | 7.5 |

BINDER SOLUTION D

| | Grams |
|---|---|
| Hydroxypropyl cellulose (Klucel E-Hercules) | 10 |
| Dioxane | 90 |

BINDER SOLUTION E

| | Grams |
|---|---|
| Ethyl cellulose (48% ethoxy-Hercules) | 10 |
| Solvent mixture of 4 parts toluene to 1 part ethanol | 90 |

To each of the aforementioned binder solutions there was added pigmented melamine powder of Example 3A to yield a dispersion having 10 to 1 powder to binder solids ratio. Each dispersion was printed on an embossed separator sheet, having an aluminum facing, by the silk screen method, and the solvents were permitted to evaporate. Each printed separator was then incorporated in a separate laminate lay-up as shown in FIG. 2 and the composites were subjected to a normal high pressure laminating pressing cycle. The resultant laminates produced had an upper surface having color in exact registration with the texture produced, and in all cases upon testing the inked areas were found to exceed NEMA testing standards.

The procedure was repeated substituting the powders of Examples 3B and 3C with each individual binder system. In each case it was found that the transfer was excellent with exact registry of color and texture, and in each case the resultant laminates exceeded NEMA testing standards.

The foregoing description of several specific embodiments will so fully reveal the general nature of the invention that others can, by applying current knowledge, readily modify such specific embodiments and/or adapt them for various applications without departing from the generic concept, and, therefore, such adaptations and modifications should and are intended to be comprehended within the meaning and range of equivalents of the disclosed embodiments. It is to be understood that the phraseology or terminology employed herein is for purposes of description and not of limitation.

What is claimed is:

1. A method of forming a unitary high pressure laminate having registered color and embossing comprising:
   (1) providing an embossed plate having an ink layer printed thereon in exact registry with the embossing on the plate, said ink layer being capable of transferring to a laminate without sideways migration and also being capable after curing of meeting NEMA standards, said ink consisting esentially of a methylol melamine resin and coloring agent mixture advanced to the B stage of cure;
   (2) assembling in a stack said embossed plate with said ink overprint coating, and a plurality of resin impregnated sheets with said ink overprint coating facing said resin impregnated sheets;
   (3) pressing said stack under a pressure of approximately 800–1,600 p.s.i. at a temperature on the order of 230°–310° F. to laminate said resin impregnated sheets together, to emboss said sheets in conformance with the embossing on said embossed plate and to transfer said ink layer from the surface of said embossed plate into the surface of said laminate in exact registry with said embossing, said embossed high pressure laminate meeting NEMA standards; and
   (4) stripping said embossed plate from said laminate thereby providing the unitary high pressure laminate having on the upper surface thereof a first colored area at a first level and a second colored area at a second level.

2. A method in accordance with claim 1 comprising, as a preliminary operation: providing an embossed plate; printing on said embossed plate in registry with the embossing a melamine ink composition comprising aqueous methylol melamine resin, pigment, silica, surfactant and diluent; applying heat to evaporate the diluent and to cure the melamine resin to the B stage thereby providing said embossed plate having a B-stage melamine resin ink layer printed thereon.

3. A method in accordance with claim 1 comprising as a preliminary operation: providing an embossed plate; printing on said embossed plate in registry with the embossing a melamine ink composition comprising (a) particles of size up to 149 microns consisting essentially of a mixture of pigment and melamine resin in the B-stage, (b) polymeric binder and (c) a liquid serving as diluent for said particles and solvent for said polymeric binder; applying heat to evaporate the liquid diluent-solvent thereby providing said embossed plate having a B-stage melamine resin ink layer printed thereon.

4. A high pressure laminate produced in accordance with the method of claim 1.

References Cited

UNITED STATES PATENTS

| | | | |
|---|---|---|---|
| 2,838,416 | 6/1958 | Babiarz et al. | 117—10 |
| 2,877,588 | 3/1959 | Ernst | 117—8 |
| 3,373,068 | 3/1968 | Grosheim et al. | 156—219 |
| 3,418,189 | 12/1968 | Grosheim | 161—413 |
| 3,536,574 | 10/1970 | Buckley | 156—219 |
| 3,542,641 | 11/1970 | Showalter et al. | 117—8 |
| 3,661,672 | 5/1972 | McQuade, Jr. | 161—413 |
| 3,698,978 | 10/1972 | McQuade, Jr. | 156—219 |

GEORGE F. LESMES, Primary Examiner

S. S. SILVERMAN, Assistant Examiner

U.S. Cl. X.R.

156—209, 220; 161—116, 123, 413, Dig. 3